Feb. 11, 1936.　　　　O. W. HOSKING　　　2,030,592
AUTOMATIC TIRE INFLATER
Filed May 9, 1934
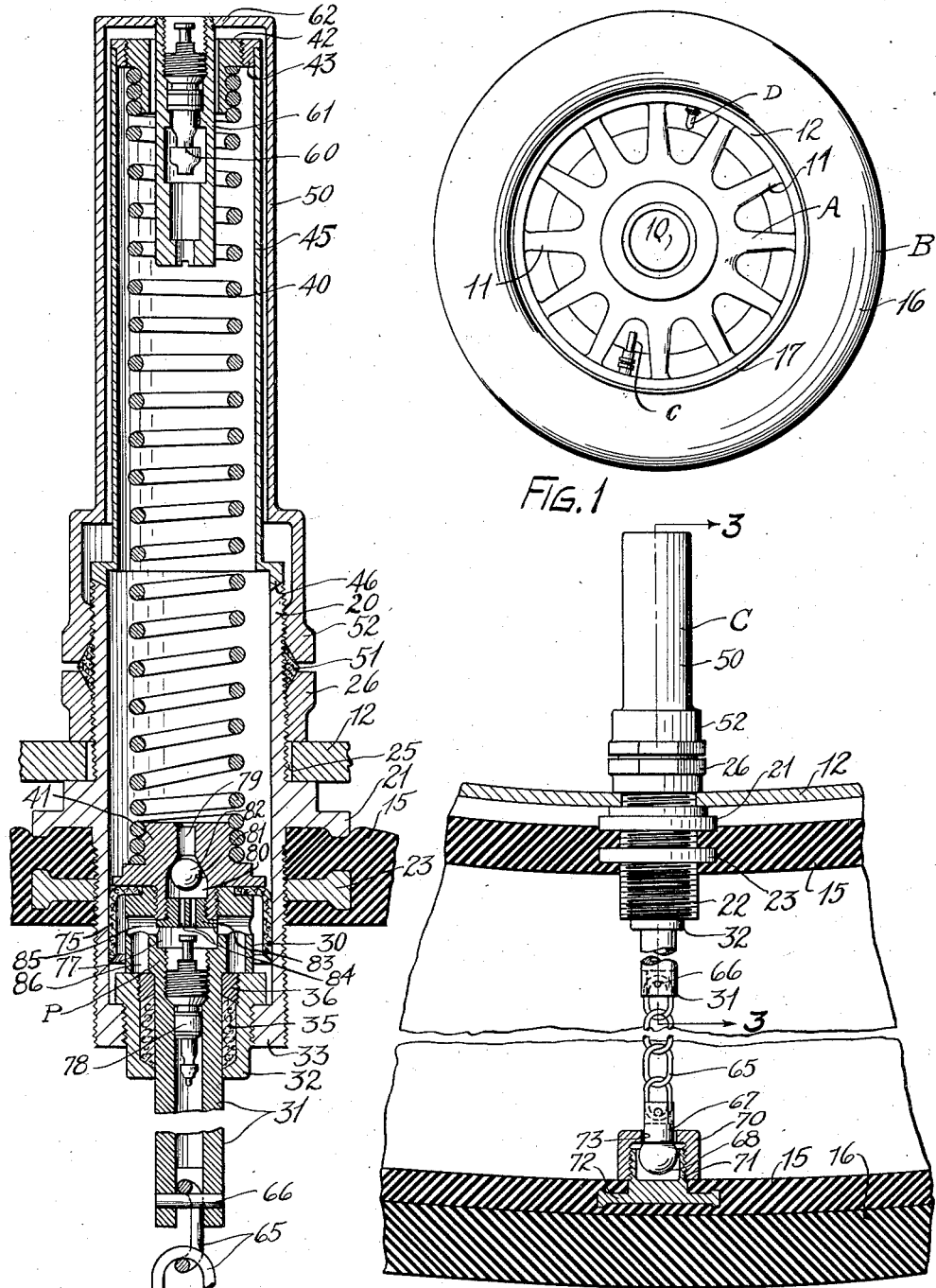
INVENTOR
OAKLEY W. HOSKING
Kwis Hudson & Kent.
ATTORNEYS Patented Feb. 11, 1936

2,030,592

UNITED STATES PATENT OFFICE 2,030,592

AUTOMATIC TIRE INFLATER

Oakley W. Hosking, Monroe, N. Y.

Application May 9, 1934, Serial No. 724,754

4 Claims. (Cl. 152—11)

The present invention relates to pneumatic tires and to a pneumatic tire inflater operated by the flexure of the tire tread as it passes over the road surface to maintain the air pressure therein, and is a continuation in part of my co-pending application Serial No. 635,833, filed October 1, 1932.

An object of the present invention is the provision of a novel pneumatic tire in which air is constantly circulated therethrough during operation to cool the tire and control the air pressure within the same.

Another object of the present invention is the provision of a novel pneumatic tire provided with an inflater for supplying air to the tire during operation and a relief valve spaced from the inflater for maintaining the air pressure in the tire constant and causing continual circulation of air through the same.

Another object of the invention is the provision of a novel inflater for a pneumatic tire adapted to be installed therewith which will be positive in operation, simple and rigid in construction, and readily assembled and disassembled for the purposes of installation, maintenance, etc.

Another object of the invention is the provision of a novel reciprocating type inflater for pneumatic tires, adapted to be permanently installed with the tire, the piston of which inflater is operated by a piston rod connected to the outer part of the inner tube or casing, in which the stuffing-box can be packed without disassembling the cylinder of the inflater from the tire assembly.

Further objects and advantages of the present invention will be apparent to those skilled in the art from the following description of the preferred embodiment thereof, hereinafter described with reference to the accompanying drawing, in which Fig. 1 is a side elevation of a motor driven vehicle wheel assembly equipped with a pneumatic tire embodying the present invention;

Fig. 2 is a section through the center of the wheel assembly shown in Fig. 1, adjacent the inflater, with portions shown in elevation; and Fig. 3 is a section with portions in elevation on the line 3—3 of Fig. 2.

Similar reference characters designate corresponding parts throughout the several views of the drawing.

Referring to the drawing, Fig. 1 illustrates a motor driven vehicle wheel assembly comprising a wheel A, pneumatic tire B, tire inflater C and a relief valve D. The wheel A, illustrated, is of conventional construction and comprises a hub 10, spokes 11, and rim 12. The pneumatic tire comprises an inner tube 15, and a tire casing 16 attached to the tire rim 12 in any conventional manner.

The tire inflater C comprises a plunger barrel or cylinder 20 and a piston or plunger, designated in general by the reference character P, adapted to be reciprocated within the plunger barrel or cylinder 20 by mechanism hereinafter referred to. The plunger barrel 20 is provided with an external annular flange 21 between the ends thereof, and is threaded both above and below the flange 21, as viewed in Figs. 2 and 3. The plunger barrel 20 is secured to the inner tube 15 by threading the lower part thereof into a threaded member 23 embedded in the inside wall of the inner tube 15, a portion of which is securely clamped between the flange 21 and the member 23. The plunger barrel 20 above the flange 21 projects through an aperture 25 in the rim 12, radially toward the center of the wheel, and the plunger barrel is securely attached to the rim 12 of the wheel A by a nut 26, which clamps the rim 12 between the same and a portion of the flange 21.

The piston or plunger P comprises a piston head 30 formed integral with a tubular piston rod 31 which projects radially through a stuffing-box 32 threaded into an aperture in the outer or lower end 33 of the plunger barrel 20. Packing 35 contained in the stuffing-box 32 prevents the leakage of air around the piston rod 31, and is taken up to compensate for wear etc., and retained in position therein by a cover or gland 36 threaded into the upper or inner end of the stuffing-box 32. Both the stuffing-box 32 and the gland 36 are accessible and removable through the upper or inner end of the plunger barrel or cylinder 20, to facilitate packing the piston rod etc. The piston rod 31 is considerably longer than the plunger barrel 20 which construction permits the piston rod to be packed etc. without removing the plunger barrel or cylinder 20 from the tube 15, etc. This construction greatly facilitates maintenance and reduces the cost on the inflater.

The piston or plunger P is continuously urged towards the hub of the wheel, or in an upward direction as viewed in Fig. 3, by a tension spring 40 attached at one end to a member 41 threaded into an aperture in the piston head 30 and at the other end to a tubular member 42 threaded into an annular member 43. The annular member 43 is provided with a flange 44 which overlies the inner or upper end of a spring housing 45. A conical outer or lower end 46 on the spring housing 45 engages a complementary surface on the inner or upper end of the plunger barrel or cylinder 20. The inner or upper end of the plunger barrel or cylinder 20, and the spring housing 45 are enclosed in an outer cover or housing 50, threaded onto the inner or upper part of the plunger barrel 20, with a packing member 51 interposed between the lower flange 52 of the housing 50 and the nut 26. Air is admitted to the inner or upper end of the plunger barrel or cylinder 20, on the outward or downward stroke of the piston or plunger P which is the compression stroke of the inflater, through an ordinary tire valve insides 60 threaded into a tubular member 61 which in turn is threaded into an aperture in the inner or upper end 62 of the outer housing 50.

The outer or lower end of the tubular piston rod 31 is attached to the radially outer or lower wall of the inner tube 15 by a flexible link chain 65, one end of which is attached to the piston rod 31 by a pin 66. The other end of the chain 65 is attached to a cylindrical member 67 provided with a spherical head 68, engaged by a member 70 threaded onto a member 71 provided with a flange 72 embedded in the inner tube 15. The member 70 has an aperture 73 through which the cylindrical member 67 projects and the construction is similar to that of a ball and socket joint.

As previously stated the outward or downward stroke of the piston or plunger P is the compression stroke, and a suitable packing washer 75 clamped between the piston head 30 and the member 41 prevents the leakage of air past the piston or plunger P during the compression stroke. The upper end of the tubular piston rod 31 opens into the air chamber 77 in the piston head 30 and is closed by an ordinary air valve insides 78 threaded into the interior of the piston rod 31. An air passage 79 in the member 41 communicates with the air chamber 77 in the piston head 30 and the cylinder above the piston or plunger P. The passage 79 is counterbored at the outer or lower end thereof as at 80, and is provided with a beveled portion 81 with which a ball check valve 82 positioned in the counterbore 80 cooperates to permit the passage of air in one direction only through the passageway 79. The ball check valve 82 is retained in position in the counterbore 80 by a retainer member 83 threaded into the outer or lower end of the counterbore 80 and provided with longitudinal apertures 84 extending therethrough. The air chamber 77 is in constant communication with the cylinder below the piston packing 75 through air passages 85 and 86, opening into the side and bottom of the piston head 30, respectively. In operation the length of the chain 65 is such that when the portion of the tire tread adjacent the inflater is not in contact with the road surface, and the tire is expanded to its normal shape the plunger or piston P will be at the outer or lower end of the cylinder with practically no air space in the cylinder below the piston head. With this construction the slightest flexing of the tread will cause air to be pumped into the tire irrespective of the air pressure in the tire.

The inflater C may be provided with a relief valve to control internal air pressure of the tire but, preferably, the air pressure in the tire is controlled by a relief valve D, positioned 180° from the tire inflater C. While the relief valve D may be of any conventional construction, the one illustrated is similar to that disclosed in Fig. 8 of the aforesaid application.

The operation of the device is as follows:

As the vehicle wheel rolls along the road surface the deflection of the casing 16, as the portion thereof adjacent the tire inflater comes in contact with the road surface, will cause the piston or plunger P to move inwardly or upwardly under the action of the spring 40. The inward or upward movement of the piston or plunger P compresses the air confined in the upper end of the cylinder and the outside housing 50, which together with the suction created below the piston, causes the same to flow through the piston or plunger P by way of the air passage 79, check valve 82, aperture 84, chamber 77, and passages 85 and 86, into the portion of the cylinder below the piston P. As the tread of the tire adjacent the tire inflater leaves the road surface the tire resumes its original shape and pulls the piston or plunger P towards the bottom of the cylinder forcing the air below the piston, through the passages 85 and 86, the chamber 77, and the valve 78 into the interior of the tire. During the upward or inward strokes of piston or plunger P, or in other words during the intake strokes, the air within the tire is prevented from escaping to the chamber 77, etc., by the valve insides 78, and during the compression stroke the check valve 80 closes, preventing the escape of air to the upper or inner end of the cylinder. When the tread adjacent the inflater leaves its contact with the road surface the tire always resumes the same position with reference to the wheel, and the piston head 30 is always pulled to the same position, that is to the extreme lower end of the cylinder 20. Air is always pumped into the tire upon each stroke of the piston or plunger P irrespective of the internal air pressure in the tire.

From the foregoing description of the preferred embodiment of the invention, it will be apparent that air is continuously circulated through the tire or tires of the vehicle during operation thereof. Upon each stroke of the plunger or piston P air will be forced into the tire and the excess air in the tire will be released through the valve D. The circulation of air through the tire has a tendency to cool the tire and afford a better regulation of the air pressure.

While the preferred embodiment of the invention has been illustrated and described, I do not intend to be limited to the particular construction shown, which may be varied within the scope of this invention, and I particularly point out and claim as my invention the following:

1. In a tire inflater for pneumatic tires, the combination of a cylinder adapted to be supported adjacent the radially inner side of the tire, a piston slidably supported within said cylinder, a piston rod connected to said piston and projecting through the radially outer end of said cylinder, means adapted to operatively connect said piston rod with the radially outer side of the tire whereby the piston is moved within said cylinder upon the flexing of the tire as it passes over a road surface, means for packing said piston rod, and means accessible from the interior of said cylinder for adjusting said packing.

2. In a tire inflater for pneumatic tires, the combination of a cylinder adapted to be supported adjacent the radially inner side of the tire, a piston slidably supported within said cylinder, a piston rod connected to said piston and projecting through the radially outer end of said cylinder, means adapted to operatively connect said piston rod with the radially outer side of the tire whereby the piston is moved within said cylinder upon the flexing of the tire as it passes over a road surface, a stuffing-box in the radially outer end of said cylinder, packing in said stuffing-box, and means for tightening the packing in said stuffing-box accessible from the interior of said cylinder.

3. In a tire inflater for pneumatic tires, the combination of a cylinder adapted to be supported adjacent the radially inner side of the tire, a piston slidably supported within said cylinder, a piston rod connected to said piston and projecting through the radially outer end of said cylinder, means adapted to operatively connect said piston rod with the radially outer side of the tire whereby the piston is moved within said cylinder upon the flexing of the tire as it passes over a road surface, and a detachable packing box in the radially outer end of said cylinder including a gland accessible from the interior of said cylinder.

4. In a tire inflater for pneumatic tires, the combination of a cylinder adapted to be supported adjacent the radially inner side of the tire, a piston slidably supported within said cylinder, a piston rod connected to said piston and projecting through the radially outer end of said cylinder, means adapted to operatively connect said piston rod with the radially outer side of the tire whereby the piston is moved within said cylinder upon the flexing of the tire as it passes over a road surface, said piston being removable through the radially inner end of said cylinder, a stuffing-box threaded into the radially outer end of said cylinder from the interior thereof, and a packing gland threaded into said stuffing-box from the interior of said cylinder.

OAKLEY W. HOSKING.